United States Patent
Prioletti et al.

(10) Patent No.: US 11,814,070 B1
(45) Date of Patent: Nov. 14, 2023

(54) SIMULATED DRIVING ERROR MODELS

(71) Applicant: Zoox, Inc., Foster City, CA (US)

(72) Inventors: Antonio Prioletti, Redwood City, CA (US); Subhasis Das, Menlo Park, CA (US); Minsu Jang, San Mateo, CA (US); He Yi, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 111 days.

(21) Appl. No.: 17/490,503

(22) Filed: Sep. 30, 2021

(51) Int. Cl.
| | | |
|---|---|---|
| *B60W 60/00* | (2020.01) | |
| *G07C 5/00* | (2006.01) | |
| *G05B 17/02* | (2006.01) | |
| *B60W 50/00* | (2006.01) | |

(52) U.S. Cl.
CPC .......... *B60W 60/001* (2020.02); *B60W 50/00* (2013.01); *G05B 17/02* (2013.01); *G07C 5/008* (2013.01); *B60W 2050/0028* (2013.01); *B60W 2050/0083* (2013.01); *B60W 2554/402* (2020.02); *B60W 2554/4041* (2020.02); *B60W 2554/4042* (2020.02); *B60W 2554/4043* (2020.02); *B60W 2554/4044* (2020.02); *B60W 2554/801* (2020.02); *B60W 2554/802* (2020.02); *B60W 2555/20* (2020.02)

(58) Field of Classification Search
CPC .................. B60W 40/02; B60W 50/00; B60W 2050/0028; B60W 2050/0083; B60W 2050/0075; B60W 60/001; B60W 60/0027; B60W 2554/402; B60W 2554/4041; B60W 2554/4042; B60W 2554/4043; B60W 2554/4044; B60W 2554/802; B60W 2554/801; B60W 2554/80; B60W 2555/20; B60W 2556/10; G07C 5/008; G05B 17/02; G05B 17/00
See application file for complete search history.

(56) References Cited

U.S. PATENT DOCUMENTS

| | | | | |
|---|---|---|---|---|
| 10,481,044 | B2 * | 11/2019 | Sun | B60W 30/00 |
| 2014/0309836 | A1 * | 10/2014 | Ollis | B60W 30/00 701/25 |
| 2021/0094540 | A1 * | 4/2021 | Bagschik | G06F 11/3013 |
| 2021/0096571 | A1 * | 4/2021 | Modalavalasa | G06V 20/56 |
| 2022/0270356 | A1 * | 8/2022 | Gyllenhammar | G06F 18/217 |
| 2022/0306161 | A1 * | 9/2022 | De Clercq | B60W 60/0027 |

* cited by examiner

*Primary Examiner* — Russell Frejd
*Assistant Examiner* — Brandon Z Willis
(74) *Attorney, Agent, or Firm* — Lee & Hayes, P.C.

(57) ABSTRACT

Techniques for determining error models for use in simulations are discussed herein. Ground truth perception data and vehicle perception data can be determined from vehicle log data. Further, objects in the log data can be identified as relevant objects by signals output by a planner system or based on the object being located in a driving corridor. Differences between the ground truth perception data and the vehicle perception data can be determined and used to generate error models for the relevant objects. The error models can be applied to objects during simulation to increase realism and test vehicle components.

20 Claims, 7 Drawing Sheets

SIMULATED DRIVING ERROR MODELS

BACKGROUND

Simulated data and simulations can be used to test and validate the features and functionalities of systems, including features and functionalities that may be otherwise prohibitive to test in the real world (e.g., due to safety concerns, limitations on time, repeatability, etc.). For example, autonomous vehicles and other moving vehicles may use driving simulations to test and improve passenger safety, vehicle decision-making, sensor data analysis, and route optimization. However, driving simulations that accurately reflect real-world scenarios may be difficult to create, as data used to create such simulations may be noisy, inconsistent, and/or incomplete. Additionally, driving simulations may involve multiple different systems and components interacting in a real-time simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
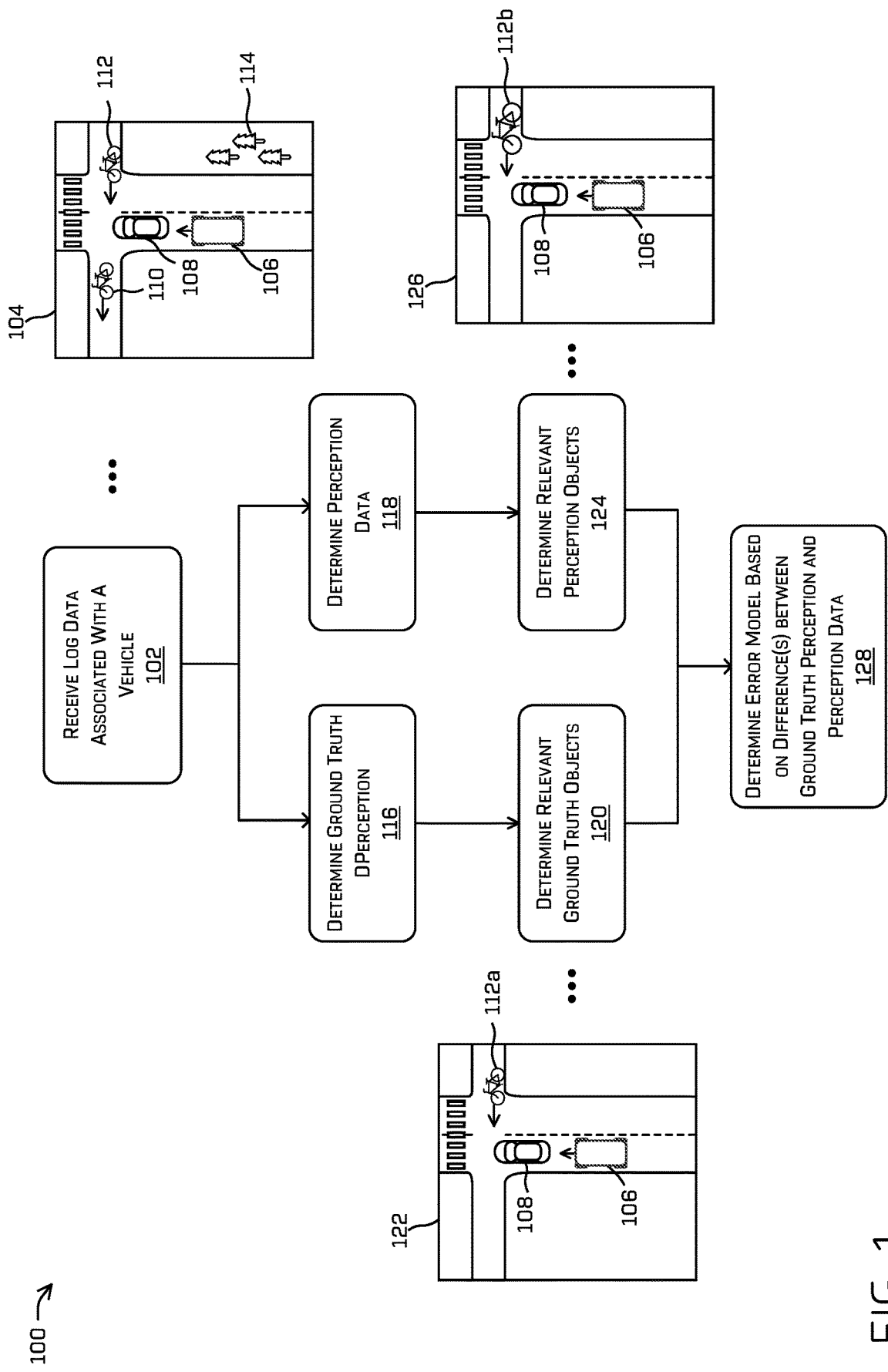
FIG. 1 is a pictorial flow diagram of an example process of determining error model(s) for use in simulation.

Techniques for determining error model(s) for use in simulating a vehicle operation are discussed herein. For example, log data can be received from a vehicle as it traverses an environment. From the log data, ground truth data can be determined, such as locations of objects, bounding boxes (and associated length, width, height, orientation, etc.), classification of objects, and the like. Further, the log data can be processed by a perception system (e.g., similar to or the same as a perception system running on an autonomous vehicle) to determine perception data. The perception data can be compared to the ground truth data to determine differences in the data. Further, relevant objects in an environment can be determined. Such relevant objects can be identified by a planning system that bases planning decision(s) on particular objects and identifies them accordingly. Additionally or alternatively, relevant objects can be determine by a location of the object relative to a driving corridor of the vehicle, based on a distance between the object and a vehicle, and the like. In some examples, error models can be determined based on objects being relevant objects. In some examples, the differences between perception data and ground truth data for relevant objects can be indexed by other metrics, such as distance between the object and a sensor in an environment, relative occlusion levels, and the like. Differences can be discretized and accumulated to generate error models over time. As objects are instantiated in a simulation and determined to be relevant objects, the error models can be applied to such objects to introduce error and to increase the realism of a simulation scenario. Accordingly, a behavior or response of a vehicle controller can be determined and/or verified for controlling an autonomous vehicle, for example.

When a physical vehicle traverses a physical environment, the physical vehicle may generate log data associated with the environment. In some examples, the physical vehicle may be an autonomous vehicle. In some examples, log data may include raw sensor data and/or data based on sensor data (e.g., bounding boxes, velocities, classifications, object dimensions, predictions, object track information, control signals, etc.). Examples of sensors that generate sensor data may include, but are limited to, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, or the like.

In some examples, the log data may be processed to determine ground truth data. In some examples, ground truth data can be determined by accurate perception models not constrained by real-time processing requirements. In some examples, the ground truth data may be, but are not limited to, location of objects, bounding boxes associated with objects, a size of the object (e.g., lengths, width, height), orientation of the object, pose of the object, classification of the objects, and the like. In some examples, the ground truth data can label objects from the log data with the correct, intended, or ideal locations, lengths, widths, height, orientation, pose, and the like.

In some examples, the log data (or raw sensor data) can also be processed by a perception system to determine perception data. In some examples, the perception system may be the same or similar as a perception system on an autonomous vehicle. Examples of perception data may be, but are not limited to, object related data that are same or similar to the ground truth data. In some examples, perception data may be less accurate than ground truth data because of real-time processing requirements or other computing or processing limitations. Therefore, while the ground truth data and the perception data may include the same objects, the characteristics of those objects (location, lengths, widths, height, orientation, pose, and the like) may be different between the ground truth data and the perception data.

In some examples, differences between the ground truth data and the perception data may be determined by comparing the two data. Examples of differences between the ground truth data and the perception data may be, but are not limited to, differences between the size of the object, the location of the object, the pose of the object, the orientation of the object, and the like. In some examples, the differences may be a false positive (e.g., the ground truth does not have the object while the perception data has the object) or a false negative (e.g., the ground truth has the object while the perception data does not have the object) associated with the object.

In some examples, the planning system can further determine relevant objects from the objects in the log data. In some examples, only the relevant objects may be included within a driving simulation for testing and/or determining a behavior or response of a vehicle controller for controlling the autonomous vehicle. In some examples, the relevancy of the object may be based on a type of the object such as whether the object is a static object (e.g., buildings, trees, road surfaces, road markers, signage, etc.) or a dynamic objects (e.g., vehicles, pedestrians, animals, bicyclists, motorcycles, etc.). In some examples, the relevancy of the object may be based on the size or volume of the object (e.g., a length, a width and/or a height of the object), a pose of the object, a location of the object, an orientation of the object, or the like. In some examples, the relevancy of the object may be based on the classification of object (e.g., whether the object is a vehicle, a pedestrian, a bicycle, a tree, a road sign, etc.). In some examples, the relevancy of the object may be based on its location relative to a driving corridor of the vehicle. In some examples, the planning system can determine the relevant objects based on one or more of the aforementioned relevancy factors. For example, the relevancy of the object may be based on the driving corridor of the vehicle and the location of the object relative to the driving corridor.

In some examples, error models can be constructed based on the differences between the ground truth data and the perception data. In some examples, error models may be determined from relevant objects. In some examples, differences between the perception data and the ground truth data can be indexed by metrics such as the distance between the object and one or more sensors in the environment, the relative occlusion level of the object, and the like. In some examples, the sensors may be associated with the vehicle. In some examples the sensors may be remote sensors or sensors associated with a different vehicle. In some examples, the greater the distance between the sensors and the object or the higher the occlusion level of the object (e.g., the more the object is occluded), the larger the differences between the perception data and the ground truth data may be. Conversely, the smaller the distance between the object and the sensors or the lower the occlusion level of the object, the smaller the differences between the perception data and ground truth data may be.

In some examples, the differences between the perception data and the ground truth data may be discretized and accumulated to generate error models over time based on a distance between the vehicle or a sensor of the vehicle and the relevant object, the level of occlusion of the relevant object, and the like. In some examples, the error models can be applied or inserted into driving simulation simulating a driving scenario of the vehicle. In some examples, the error models may be applied to the objects in order to instantiate errors within the simulation scenario to increase its realism. In some examples, application of error models into the simulation may be used to test and/or verify a behavior of a vehicle controller of the vehicle. In some examples, application of error models into the simulation may be used to test and/or verify a behavior of one or more other systems of the vehicle. In some examples, application of error models to test and/or verify the behavior one or more systems of the vehicle may further ensure that the system is robust and able to handle deviations presented by the error model.

The purpose of driving simulations can be to test and validate systems of a vehicle traversing an environment. In some examples, driving simulations may be used to test individual components or systems of the simulated vehicle (e.g., a lidar sensor, a radar sensor, or an image sensor), while other driving simulations may test the simulated vehicle as a whole including interactions between the various components or systems of the vehicle. Such simulations may comprise scenarios which rarely occur in the real world, yet still require testing to validate safe operation, as well as scenarios which frequently occur in the real world.

In some examples, a driving simulation system may perform virtual driving simulations, in which a simulated vehicle may interact with a simulated objects in a simulated virtual environment. In virtual driving simulations, the simulated objects within the environment may include software-based objects including artificial intelligence(s) and/or other algorithms that can react to the actions of simulated vehicle, while the simulated vehicle also reacts to the simulated objects and to the conditions of the simulated environment. In some examples, virtual simulations may provide highly realistic testing and validation for real-world driving scenarios, by executing all of the simulated components (e.g., simulated vehicle(s), objects, and environment) concurrently within the virtual environment and supporting communications and interactions between the simulated components. In some examples, virtual simulations may provide testing and validation for real-world driving scenario using individual simulated components or systems.

Virtual simulations may be resource intensive and computationally expensive, which may limit the number and utility of the simulation scenarios that can be executed within a computing environment. For example, when creating a virtual simulation environment to perform testing and validation, a simulation system may specifically instantiate the environment with various and specific examples.

In some examples, the driving simulation system can perform a virtual driving simulation as a log-based driving simulation. In some examples, log-based driving simulation may use the previously collected log data to generate the simulated objects and environment in which to test the simulated vehicle. In some examples, log-based driving simulations may rely on previously recorded sensor data from a system operating in an environment, such as an autonomous vehicle traversing an environment, to provide driving simulation scenarios for testing and validation purposes.

In some examples, when generating simulation instructions, a scenario generator of the vehicle simulation system can identify objects represented in the log data. For example, the scenario generator can use log data to instantiate the objects within the environment. The objects can include static objects (e.g., buildings, trees, road surfaces, road markers, signage, etc.) and dynamic objects (e.g., vehicles, pedestrians, animals, bicyclists, motorcycles, etc.). Additional object attributes or parameters can be determined and used to instantiate the objects in a log-based driving simulation such as the size of the objects, the type of the objects, the location of the objects, the orientation of the objects, the pose of the objects, the trajectory of the objects, and the like.

To generate a log-based driving simulation, the real vehicle that initially collected the log data can transmit the log data, via a network, to a database that stores log data and/or to a computing device executing a scenario generator. As discussed above, the log data can include perception data that identifies objects (e.g., roads, sidewalks, road markers, signage, traffic lights, other vehicles, pedestrians, cyclists, animals, etc.) and/or bounding boxes that represent the objects. The scenario generator can use the log data to generate simulation instructions to simulate a scenario. For example, the environment (e.g., roads, buildings, signage, etc.) traversed by the vehicle can be represented as a simulated environment in the simulated scenario. The simulated scenario can be similar to or identical to the captured environment or deviate from the captured environment. In some examples, the simulated environment can have more or fewer number of objects as in the captured environment. In some examples, the simulated objects may be the relevant objects. In some examples, the error models may be applied to the driving simulation which may change one or more characteristics of the simulated object (e.g., size, shape, false positive, false negative, and the like). In some examples, applying the error models to the driving simulation may be used to test and/or confirm the behavior of a vehicle controller of the vehicle.

Techniques for determining error model(s) for use in simulating a vehicle operation can improve the functions of a vehicle by providing a robust method of determining relevant objects from log data, determining error models of the relevant objects, and testing and/or confirming the behavior of a vehicle controller of a vehicle by applying the error models to a driving simulation. In the context of determining relevant objects from log data and determining error models of the relevant objects, limiting the data to relevant objects can improve the accuracy of the error models. In the context of testing and/or confirming the behavior of the vehicle controller of the vehicle by applying the error models to the driving simulation, applying the error model to the driving simulation can increase the realism when simulating the perception system of the vehicle, and testing using the driving simulation can improve the safety of vehicle operations without subjecting the vehicle to unnecessary real world testing.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in semi-autonomous or non-autonomous vehicles, and/or in an aviation or nautical context.

FIG. 1 illustrates an example process 100 for determining an error model associated with one or more objects in an environment.

Figure 6:
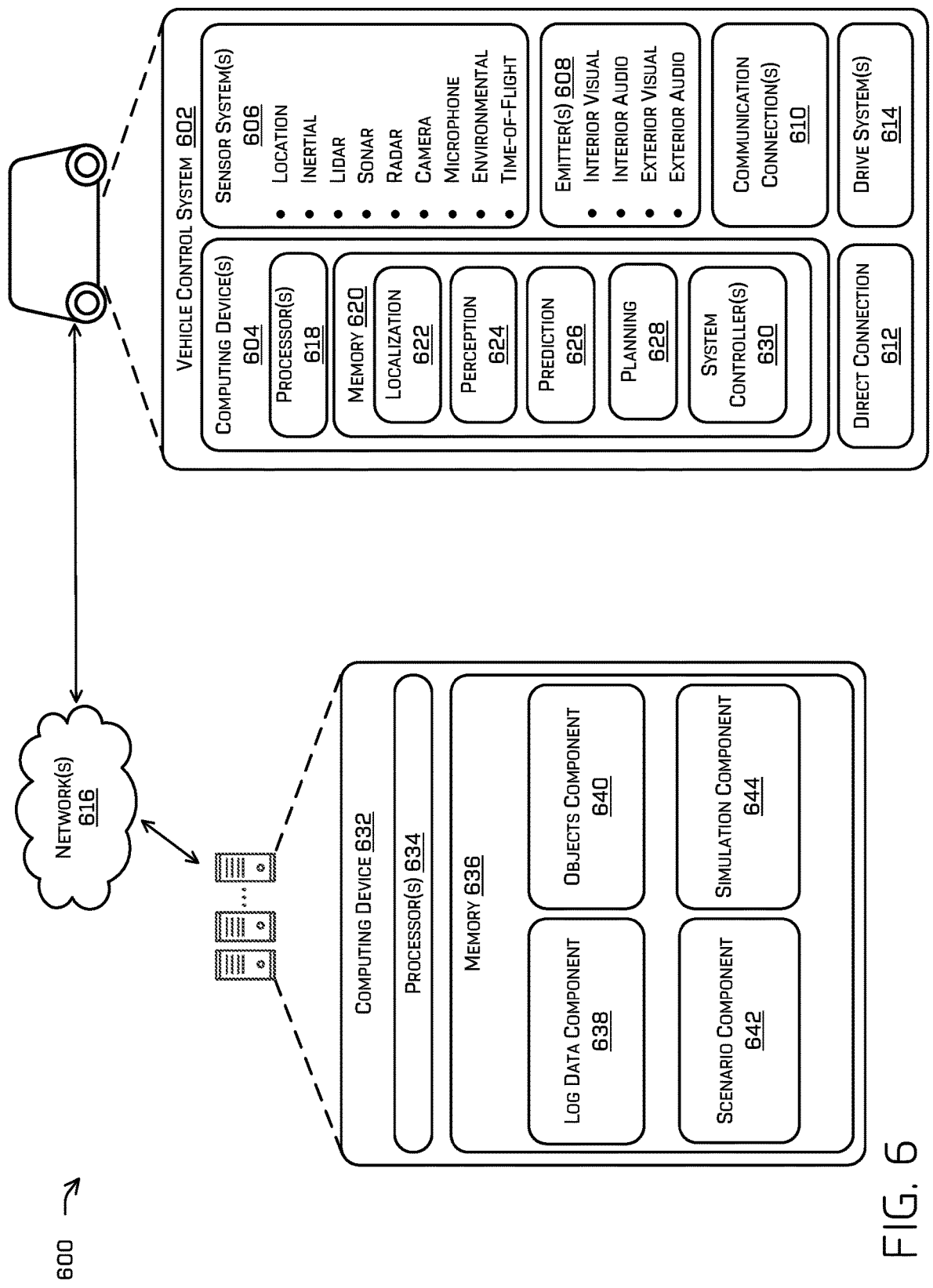
FIG. 6 includes a block diagram of an example architecture of a vehicle control system and a computing system for performing driving simulations, as described herein.

At operation 102, a computing system and/or device may receive log data associated with operations of a vehicle in an environment. In some examples, the log data may include raw sensor data of one or more sensors associated with the vehicle and/or data based on the raw sensor data. In some examples, the computing system and/or device may be the same or similar computing system and/or device as computing device 632 or the computing device as illustrated in FIG. 6. In some examples, the vehicle may be an autonomous vehicle. An example of the vehicle operating in the environment is illustrated in example 104. Example 104 illustrates a driving scenario where vehicle 106 approaches a second vehicle 108 that is stopped at an intersection. Other objects within the environment includes first bicycle 110, second bicycle 112, and trees 114. In some examples, the one or more sensor components of vehicle 106 may capture sensor data associated with the vehicle 106, first bicycle 110, second bicycle 112, and/or trees 114.

In some examples, the log data may include one or more of the second vehicle 108, first bicycle 110, second bicycle 112, and/or trees 114 within the proximity of vehicle 106 and attributes or characteristics of the environment and objects (e.g., classifications, sizes, shapes, positions, trajectories, etc.). In some examples, log data may include data associated with bounding boxes associated with the objects. In some examples, one or more of the second vehicle 108, first bicycle 110, second bicycle 112, and/or trees 114 may be partially or wholly occluded. In some examples, the objects in example 104 may correspond to objects observed by the various sensor components of vehicle 106.

In some examples, the log data may include particular events or behaviors of objects in example 104 as observed by vehicle 106, such as accidents or near accidents, traffic violations, crossing or jaywalking by pedestrians, cyclists, or animals, weather anomalies, construction zones, detours, school zones, or the like. In some examples, these particular events or behaviors may be designated from a list of events/behaviors that are desirable for use as driving simulations. In some examples, the particular events or behaviors may be identified either automatically by the object detection and/or analysis systems of vehicle 106, through input by a passenger of vehicle 106 flagging and/or labeling the particular event or behavior, and/or through input by a user of a remote system during a post-event analysis.

At operation 116, the process can include determining ground truth perception for the objects in the log data. In some examples, the ground truth perceptions may be the actual or expected location of the objects, bounding boxes associated with objects, size of the objects (e.g., lengths, width, height), orientation of the objects, pose of the objects, classification of the objects, and the like. In some examples, when determining the ground truth perception, the operation can include labeling the objects with their actual or expected location, bounding boxes associated with the objects, actual or expected size of the objects (e.g., lengths, width, height), actual of expected orientation of the objects, actual or expected pose of the objects, actual or expected classification of the relevant objects, and the like. In some examples, ground truth perception may be determined by accurate perception models not constrained by real-time processing requirements.

At operation 118, a perception system associated with the vehicle such as vehicle 106 can determine perception data from the log data. In some examples, the perception system may be same or similar to perception component 624 as illustrated in FIG. 6. In some examples, when determining perception data, the perception system may label the objects with the location of the objects, bounding boxes associated with the objects, size of the objects (e.g., lengths, width, height), orientation of the objects, pose of the objects, classification of the objects, and the like as logged in the log data.

At operation 120, the process can include determining relevant ground truth objects from ground truth perception such as whether one or more of the second vehicle 108, first bicycle 110, second bicycle 112, and/or trees 114 as illustrated in example 104 is a relevant ground truth object. While example 104 only illustrates four objects, vehicle 106 may encounter scores of objects at any given time while traversing through the environment. Not all of those objects may be relevant when testing and/or confirming a behavior or response of a vehicle controller of vehicle 106. However, each additional object may introduce additional noise which may negatively affect the accuracy or realism when testing and/or confirming the behavior or response of the vehicle controller and add to the processing time. Therefore, it can be important to determine the relevant objects from the log data to include when testing and/or confirming the behavior or response of the vehicle controller. In some examples, the planning system associated with vehicle 106 may determine relevant objects based on one or more object's classification, size, shape, position, orientation, pose, location, trajectories, and the like. In some examples, the planning system may determine the relevant objects based on one or more object's association with a driving corridor of vehicle 106. In some examples, the planning system may determine the relevant objects based on the driving scenario, a threshold distance to the vehicle, an observed or predicted trajectory, and the like.

An example of determining relevant ground truth objects is illustrated in example 122. In example 122, the planning system determines that the relevant ground truth objects from example 104 are the second vehicle 108 and the second bicycle 112. Some reasons that the planning system did not determine the first bicycle 110 and the trees 114 as relevant ground truth objects may be the trajectory of the first bicycle 110 takes the first bicycle 110 away from vehicle 106, the trees 114 are static objects on the side of the roadway, vehicle 106 has already passed the trees 114, and neither the first bicycle 110 and the trees 114 are within vehicle 106's driving corridor.

At operation 124, the planning system and/or the perception system may determine relevant perception objects from the perception data. The process of determining the relevant perception objects may be largely similar to those described for operation 120.

An example of determining relevant perception objects is illustrated in example 126. Example 126 is largely similar to example 122. One difference between example 122 and example 126 is between second bicycle 112a and second bicycle 112b. Second bicycle 112a and second bicycle 112b are the same object as second bicycle 112. However, second bicycle 112a represents ground truth perception of second bicycle 112 while second bicycle 112b represents perception data of second bicycle 112. In example 126, second bicycle 112b has a larger size than second bicycle 112a.

At operation 128, an error model based on correspondence(s) between ground truth perception and perception data can be determined. In some examples, the error model may be determined by vehicle 106. In some examples, the error model may be determined by a computing system and/or device that is the same or similar computing system and/or device as computing device 632 as illustrated in FIG. 6. In some examples, an error can be determined by determining a correspondence between a relevant ground truth object and a relevant perception object. In some examples, determining a correspondence may include determining a difference between one or more attributes of the relevant ground truth object and one or more attributes of the relevant perception. In some examples, the correspondence may reveal a false positive when a relevant perception object cannot correspond to any relevant ground truth object. In some examples, the correspondence may reveal a false negative when a relevant ground truth object cannot correspond to any relevant perception object. In some examples, false positive or false negative may be determined using some or all ground truth objects and some or all perception objects instead of only relevant ground truth objects and relevant perception objects.

Examples of the attributes may be but are not limited to a length, a width, a height, a velocity, a trajectory, a location, an orientation, a classification, a classification confidence level, a segmentation level, time as false positive, time as false negative, and the like. In some examples, the classification may be whether the relevant object is a static object or a dynamic object. In some examples, the segmentation level may be whether when comparing the relevant ground truth object and the perception object, whether one or more of the objects has been oversegmented, undersegmented, or properly segmented. In some examples, the error can be indexed and discretized by metrics such as a distance between each relevant object and a sensor associated with vehicle 106, a distance between each relevant object and vehicle 106, object classification, planning system interaction type, a weather condition, a lighting condition, relative occlusion levels of each relevant object, and the like. Examples of object classification maybe be, but are not limited to, whether the object is a static object or a dynamic object or whether the object is a vehicle, pedestrian, a tree, a building, and the like. Examples of planning system interaction type may be, but are not limited to, one or more pedestrians crossing (e.g., crossing at a crosswalk or jaywalking), one or more double parked vehicle, vehicle 106 following vehicle 108, vehicle 106 approaching a junction, a second vehicle merging into the lane that vehicle 106 currently occupies, and the like. In some examples, the error can be discretized and accumulated to generate an error distribution over time. In some examples, the error distribution may be between a range of values. In some examples, (e.g., for false positive or false negative) the error distribution may be a binomial distribution. Examples of determining an error model can be found can be found, for example, in U.S. patent application Ser. No. 16/708,019 titled "Perception Error Models" and filed Dec. 9, 2019, the entirety of which is herein incorporated by reference in its entirety for all purposes.

Figure 2:
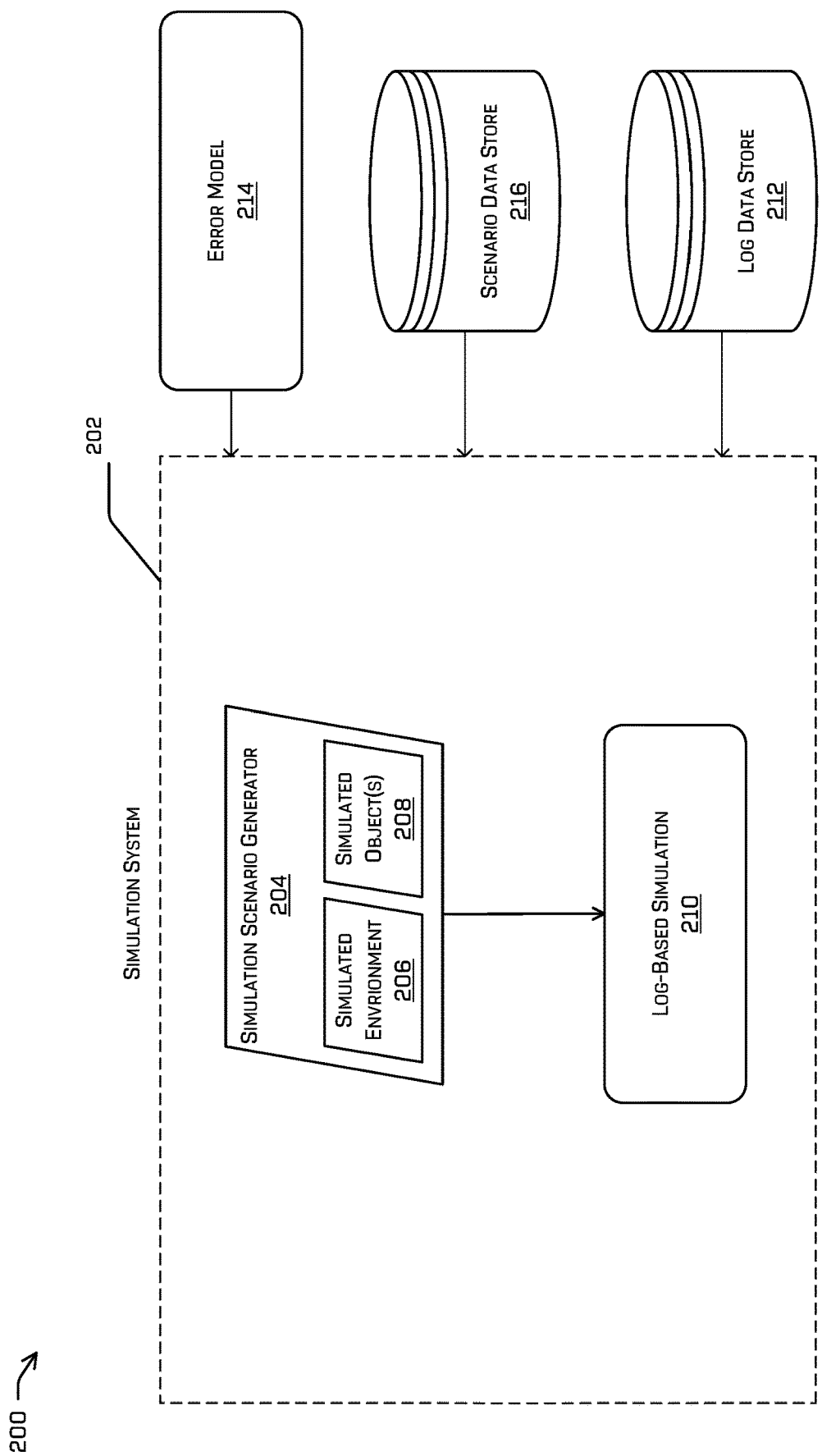
FIG. 2 is an illustration of an example simulation system.

FIG. 2 illustrates an example 200 of a computing architecture configured to execute a driving simulation. Example 200 includes a simulation system 202, including a simulation scenario generator 204 and a log-based driving simulation system 210. In some examples, the simulation system 202 may be within a computing device that is the same or similar computing system and/or device as computing device 632 as illustrated in FIG. 6. In some examples, log-based driving simulation system 210 may be depicted as separate computing systems which may operate independently in different computing environments, different hardware, different networks, or the like. In some examples, log-based driving simulation system 210 may be implemented as different components or functionalities within the same computing system, which may be similar or identical to the components and architecture of the example computing device 632 depicted in FIG. 6. In some examples, example 200 may be used to test and/or confirm a behavior or response of a vehicle controller, one or more components of a vehicle control system, and the like.

In some examples, simulation system 202 may receive log data associated with a real vehicle traversing through a real environment such as from vehicle 106 of example 104. In some examples, the log data may be stored in log data store 212. In some examples, log data store 212 maybe be integrated into a memory of simulation system 202. In some examples, log data store 212 may be a separate component from simulation system 202 such as being integrated with memory 620 or memory 636 of FIG. 6. In some examples, the log data may include raw sensor data and/or data of environmental objects based on sensor data (e.g., bounding boxes, velocities, classifications, object dimensions, predictions, object track information, control signals, position in the environment, or the like). The log data may be used by simulation scenario generator 204 to instantiate simulated environment 206 and simulated object(s) 208 within the vehicle simulation executed by log-based driving simulation system 210. In some examples, simulated object(s) 208 may be relevant object determined during operation 116 of FIG. 1.

In some examples, simulation system 202 may receive synthetic data from scenario data store 216. In some examples, the synthetic data may be largely similar to log data, but may not be associated with the real vehicle traversing through the real environment. In some examples, the synthetic data may be utilized to instantiate simulated environment 206 and simulated object(s) 208 in the same ways that log data is used instantiate simulated environment 206 and simulated object(s) 208.

In some examples, one or more error model such as error model 214 may be applied to simulation system 202 to perturb one or more of the simulated object(s) 208. In some examples, error model 214 may be same or similar to the error model determined by operation 128. In some examples, applying error model 214 may alter one or more attributes of simulated object(s) 208.

Figure 3:
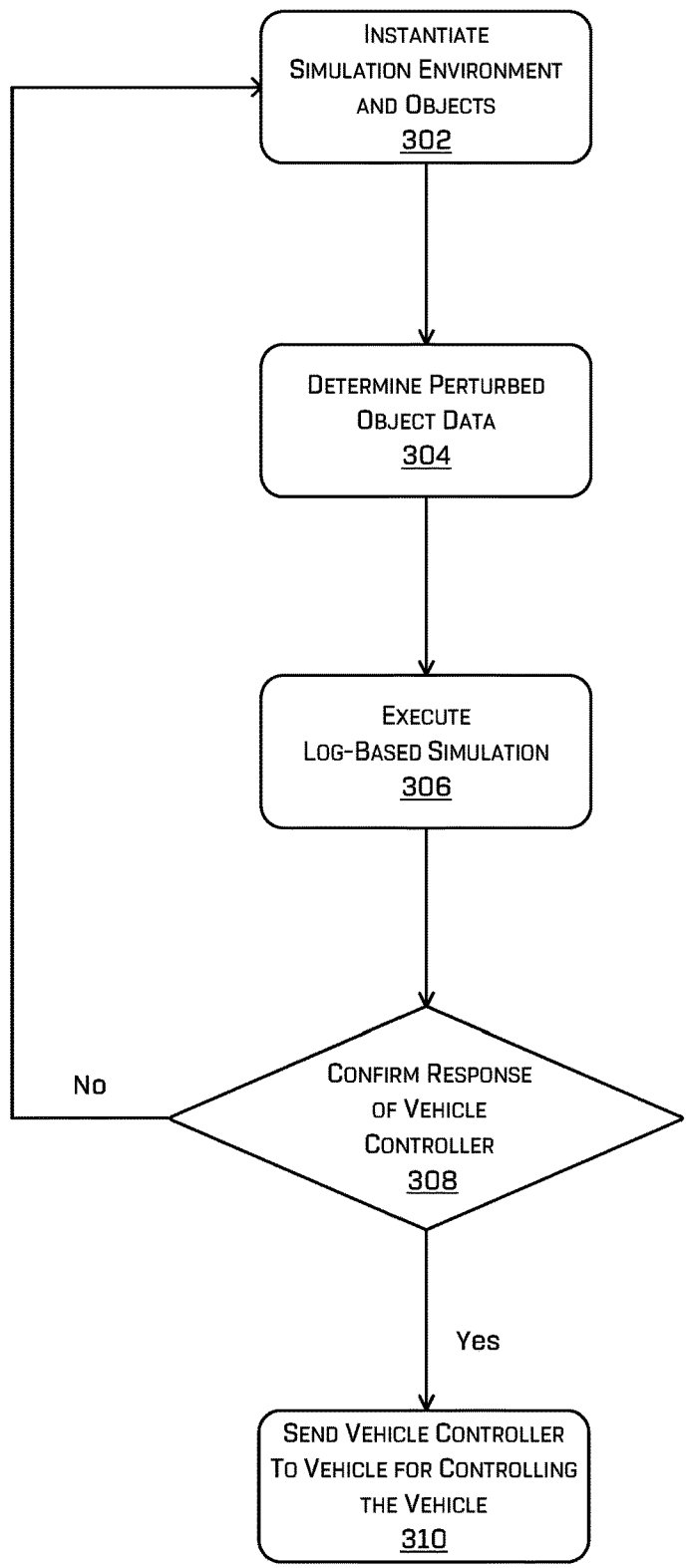
FIG. 3 is an illustration of an example process of confirming a response of a vehicle controller.

FIG. 3 illustrates an example process 300 for executing a log-based driving simulation. Example process 300 may be performed, for instance, by simulation system 202 such as described in FIG. 2, and/or by computing device 632 such as described in FIG. 6.

At operation 302, the log-based driving simulation system 210 can instantiate a simulated environment and simulated objects. In some examples, the log-based driving simulation system 210 may use a scenario generator, such as scenario generator 204 to instantiate simulated environment 206 as the simulated environment and simulated object(s) 208 as the simulated objects. In some examples, the simulated objects may include the vehicle and the relevant objects. In some examples, the simulated objects may include some or all objects from the log data. In some examples, the simulated objects may be instantiated based on the ground truth perception. In some examples, the simulated objects may be instantiated as one or more programmatic agents or objects (e.g., artificial-intelligence based agents) during a log-based driving simulation and may add to the simulation environment one or more intelligent agents whose actions are not based merely on the log data but are independently determined at least in part based on the programmatic behaviors of the intelligent agents.

At operation 304, the simulation generator 204 can determine a perturbed object data from the error model. In some examples, the perturbed object data may apply the error distribution to the simulated objects which may result in altering one or more attributes of the simulated objects. Examples of the attributes may be but are not limited to a length, a width, a height, a velocity, a trajectory, a location, an orientation, a position, a pose, a segmentation level, and the like. In some examples, the perturbed object data may alter the attributes according to metrics such as distance between each simulated object 208 and a sensor of vehicle 106, relative occlusion levels of each simulated object 208, and the like. In some examples, the attributes may be altered according to the error distribution of the error model, and therefore, the values of the attributes of the simulated objects during one log-based driving simulation may be different from the values of the attributes during a different log-based driving simulation. In examples, where all objects from the log data are simulated by simulation generator 204, relevant objects may be determined, and only the relevant objects may be perturbed by the error model.

At operation 306, the log-based driving simulation system 210 may execute the log-based driving simulation for the vehicle. In some examples, as the driving simulation simulates vehicle 106 traversing the simulated environment, the log-based driving simulation system 210 can perturb one or more simulated objects by applying the perturbed object data to one or more simulated objects. In some examples, applying the perturbed object data may alter one or more attributes of one or more simulated objects according to the error distribution associated with a particular distance between a particular simulated object and the simulated vehicle, the relative occlusion levels of the simulated object, and the like in order to increase the realism of the simulation.

At operation 308, the log-based driving simulation may be used to confirm a response of a vehicle controller of vehicle 106 such as confirming an accuracy and/or consistency of the vehicle controller. In some examples, the log-based simulation may be used to confirm the behavior or response of a component of the vehicle control system such as a sensor component (e.g., a time-of flight sensor, a lidar sensor, a radar sensor, a sonar sensor, an infrared sensor, a camera, and the like). In some examples, the log-based driving simulation may continuously execute the log-based driving simulation, and monitor collisions between the simulated vehicle and one or more simulated objects. In some examples, the collisions may be compared to a collision threshold. In some examples, the behavior or response of the vehicle controller may be confirmed when the number or percentage of the collisions are below the collision threshold.

In some examples, when the simulation cannot confirm the response of the vehicle controller, the process restarts at operation 302 and continue until the response of the vehicle controller is confirmed. In some examples, when the response of the vehicle controller is confirmed, the process continues to operation 310. At operation 310, when the response of the vehicle the vehicle controller is confirmed, the vehicle controller can be sent to vehicle 106 for controlling vehicle 106.

Figure 4:
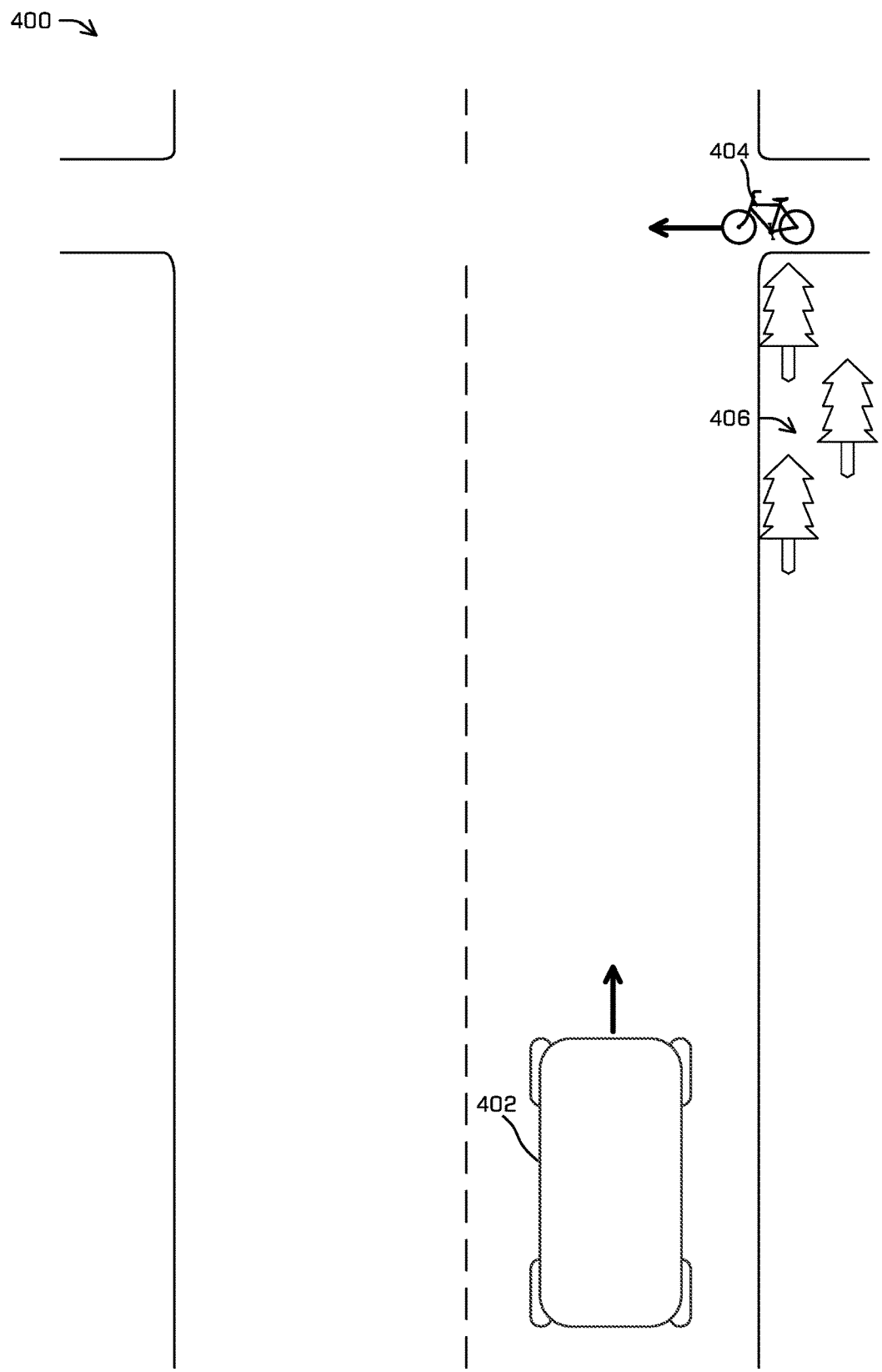
FIG. 4 is an illustration of an example of perception data with an occluded object.

FIG. 4 illustrates an example 400 of a driving scenario from the perception data. Example 400 includes a vehicle 402, a bicycle 404, and trees 406. Vehicle 402 may be the same or similar vehicle as vehicle 106. Vehicle 402 is traversing along a roadway toward an intersection. As illustrated in FIG. 4, the second bicycle 404 is approaching the intersection in the along a trajectory that intersects with a trajectory of vehicle 402. Bicycle 404 is partially occluded by trees 406, and vehicle 402 is a distance away from bicycle 404. In some examples, because bicycle 404 is partially occluded, a sensor component of vehicle 402 may detect bicycle 404 at a size smaller than its ground truth perception. Therefore, the perception data would have bicycle 404 at a size smaller than its ground truth perception. The difference between the size in the perception data and the ground truth perception may be discretized at the level of occlusion of bicycle 404 and/or the distance between vehicle 402 and bicycle 404.

Figure 5:
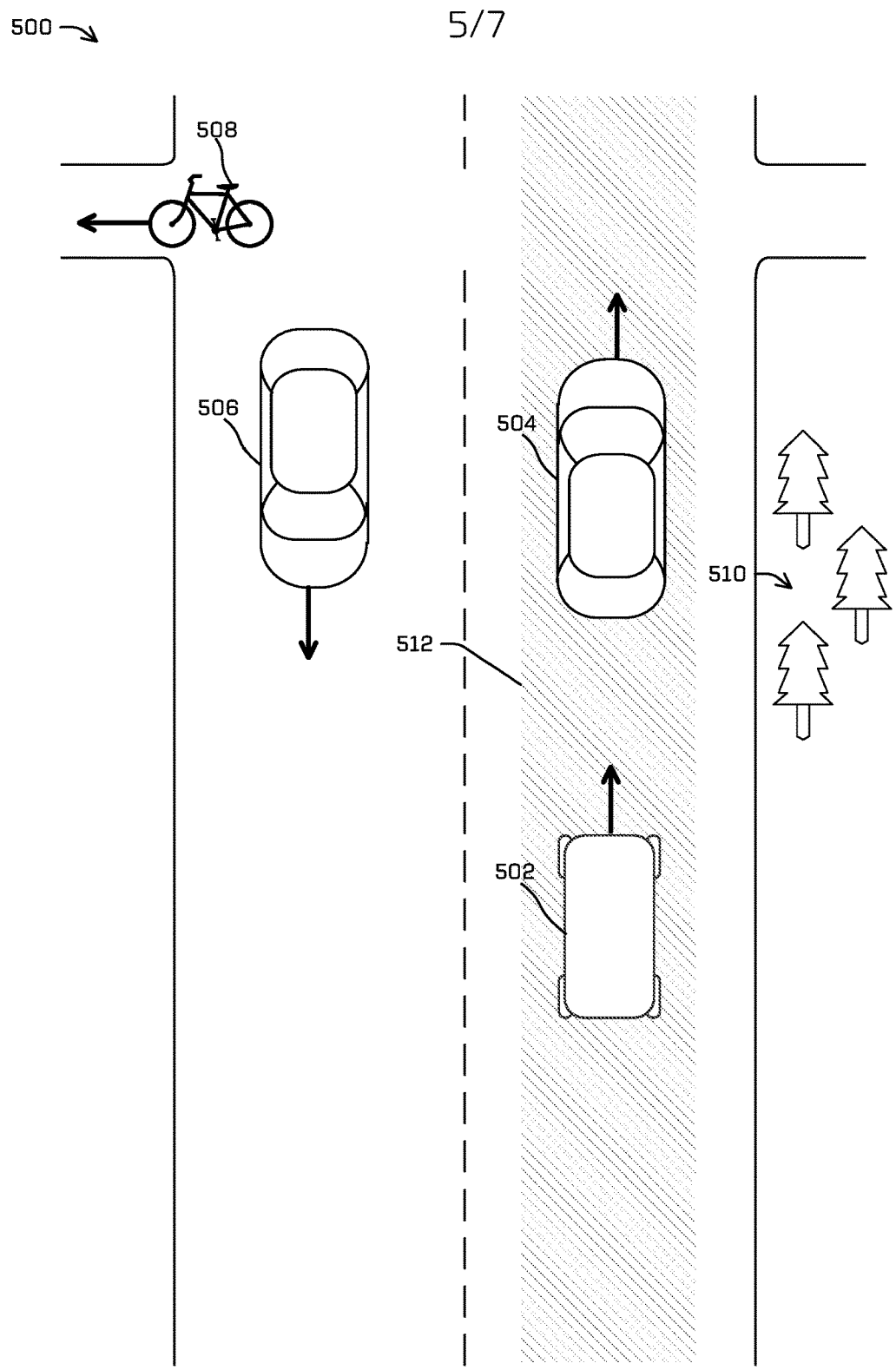
FIG. 5 is an illustration of a vehicle traversing an environment along a driving corridor.

FIG. 5 illustrates an example 500 of a driving scenario of a vehicle traversing an environment. Example 500 includes first vehicle 502, second vehicle 504, third vehicle 506, bicycle 508, trees 510, and driving corridor 512. First vehicle 502 traverses the environment along driving corridor 512. Second vehicle 504 traverses the environment in corridor 512 along the same trajectory as first vehicle 502. Third vehicle 506 is traveling in an opposing lane in the opposite direction. First vehicle 506 may correspond to vehicle 106. Driving corridor 512 represents a drivable area of vehicle 502. The drivable area represents a region in the environment (e.g., a lane of a roadway) where vehicle 502 can travel. In some examples, a planning system of first vehicle 502 can determine one or more relevant objects from second vehicle 504, third vehicle 506, bicycle 508 based on their interactions and/or future or potential interaction with driving corridor 512 and/or are located within driving corridor 512. In some examples, the planning system can determine that third vehicle 506, bicycle 508, and trees 510 do not interact with driving corridor 512 and/or are not within driving corridor 512 and therefore are not relevant objects. In some examples, the planning system can determine that second vehicle 504 is within driving corridor 512 and therefore is a relevant object.

FIG. 6 illustrates an example computing environment 600 that may be used to implement the driving simulation systems according to the techniques described herein. The computing environment 600 may include a computing device 632 and a vehicle control system 602. In this example, the computing device 632 may instantiate and execute log-based driving simulations such as those described above in process 300 and may confirm a behavior of the vehicle control system 602 or one or more components of vehicle control system 602 using the log-based driving simulations. The components of computing device 632 may be implemented within a single computing system, as in this example, or may be implemented in separate computer systems.

The vehicle control system 602 may include various software-based and/or hardware-based components of an autonomous vehicle, and may be used to control autonomous vehicles traversing through physical environments and/or simulated vehicles operating within virtual and/or log-based driving simulations. The vehicle control system 602 may be similar or identical to the vehicle control system of vehicle 106.

In this example, the vehicle control system 602 and the computing device 632 and are illustrated as discrete computing systems communicating over one or more networks 616, although in other implementations the functionality of each of the systems 602, 632, may be carried out in the same computing environment. By way of non-limiting example, software executing the functionality of the vehicle control system 602 may be uploaded or otherwise incorporated into the computing device 632 and/or software executing the computing device 632 may be uploaded to or otherwise made incorporated into the vehicle control system 602.

The vehicle control system 602 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 602 may operate within a real associated vehicle, such as a fully or partially autonomous vehicle having any other level or classification. In some instances, the techniques described herein for the may be usable by non-autonomous vehicles as well. Additionally and/or alternatively, the vehicle control system 602 may operate independently from any vehicle, for example, as a hardware and software-based controller for a simulated vehicle executing in a computing environment during the development, testing, and validation processes for the vehicle control system 602. In addition, while implementations of the vehicle control system 602 described herein may include simulating a control system of an autonomous vehicle, semi-autonomous vehicle, or a non-autonomous vehicle, some of the techniques may be in a simulated environment, using a simulated vehicle.

The vehicle control system 602 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 602 can be powered by one or more internal combustion engines, one or more electric motors, hydrogen power, any combination thereof, and/or any other suitable power sources. Although the associated vehicle may have four wheels, the vehicle control system 602 and associated techniques described herein can be incorporated into vehicles having fewer or a greater number of wheels, and/or tires. The vehicle control system 602 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 602 can include a computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle to exchange data and/or to provide power), and one or more drive system(s) 614. The one or more sensor system(s) 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the real or simulated vehicle associated with the vehicle control system 602. As another example, the camera sensors can include multiple cameras disposed at various locations about the exterior and/or interior of the associated real or simulated vehicle. The sensor system(s) 606 can provide input to the computing device(s) 604.

The vehicle control system 602 can also include one or more emitter(s) 608 for controller the emitting of light and/or sound via the real or simulated vehicle associated with the vehicle control system 602. The one or more emitter(s) 608 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 602 can also include one or more communication connection(s) 610 that enable communication between the vehicle control system 602 and one or more other local or remote computing device(s) (e.g., a remote teleoperations computing device) or remote services. For instance, the communication connection(s) 610 can facilitate communication with other local computing device(s) on the associated real or simulated vehicle, and/or the drive system(s) 614. Also, the communication connection(s) 610 can allow the vehicle to communicate with other nearby computing device(s) (e.g., other nearby vehicles, traffic signals, etc.).

The communications connection(s) 610 can include physical and/or logical interfaces for connecting the computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 610 may comprise the one or more modems as described in detail above.

In at least one example, the vehicle control system 602 can include one or more drive system(s) 614. In some examples, the real or simulated vehicle associated with the vehicle control system 602 can have a single drive system 614. In at least one example, if the vehicle has multiple drive systems 614, individual drive systems 614 can be positioned on opposite ends of the associated vehicle (e.g., the front and the rear, etc.). In at least one example, the drive system(s) 614 can include one or more sensor system(s) 606 to detect conditions of the drive system(s) 614 and/or the surroundings of the vehicle. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle control system 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more modules to perform various functionalities of the drive system(s) 614. Furthermore, the drive system(s) 614 also include one or more communication connection(s) that enable communication by the respective drive system with one or more other local or remote computing device(s).

The computing device(s) 604 within the vehicle control system 602 can include one or more processor(s) 618 and memory 620 communicatively coupled with the one or more processor(s) 618. In the illustrated example, the memory 620 of the computing device(s) 604 stores a localization component 622, a perception component 624, a prediction component 626, a planning component 628, and one or more system controller(s) 630. Though depicted as residing in the memory 620 for illustrative purposes, it is contemplated that the localization component 622, the perception component 624, the prediction component 626, the planning component 628, and the one or more system controller(s) 630 can additionally, or alternatively, be accessible to the computing device(s) 604 (e.g., stored in a different component of vehicle control system 602 and/or stored remotely and accessible to the vehicle control system 602.

In memory 620 of the computing device(s) 604, the localization component 622 can include functionality to receive data from the sensor system(s) 606 to determine a position of the real or simulated vehicle associated with the vehicle control system 602. For example, the localization component 622 can include and/or request/receive a three-dimensional map of the real or simulated environment and can continuously determine a location of the autonomous vehicle within the map. In some instances, the localization component 622 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 622 can provide data to various components of the vehicle control system 602 to determine an initial position of an autonomous vehicle for generating a trajectory, as discussed herein.

The perception component 624 can include functionality to perform object detection, segmentation, and/or classification. In some examples, the perception component 624 can provide processed sensor data that indicates a presence of an entity that is proximate to the real or simulated vehicle associated with the vehicle control system 602 and/or a classification of the entity as an entity type (e.g., car, pedestrian, cyclist, building, tree, road surface, curb, sidewalk, unknown, etc.). In additional and/or alternative examples, the perception component 624 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 624 can include functionality to store perception data generated by the perception component 624. In some instances, the perception component 624 can determine a track corresponding to an object that has been classified as an object type. For purposes of illustration only, the perception component 624, using sensor system(s) 606 can capture one or more images of a real or simulated environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 626 can generate one or more probability maps representing prediction probabilities of possible locations of one or more objects in a real or simulated environment. For example, the prediction component 626 can generate one or more probability maps for vehicles, pedestrians, animals, and the like within a threshold distance from the vehicle 602. In some instances, the prediction component 626 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 628 can determine a path for the vehicle control system 602 to direct the real or simulated vehicle through an environment. For example, the planning component 628 can determine various routes and paths and various levels of detail. In some instances, the planning component 628 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 628 can generate an instruction for guiding the autonomous vehicle along at least a portion of the route from the first location to the second location. In at least one example, the planning component 628 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 628 can alternatively, or additionally, use data from the perception component 624 to determine a path for the real or simulated vehicle associated with the vehicle control system 602 to follow to traverse through an environment. For example, the planning component 628 can receive data from the perception component 624 regarding objects associated with an environment. Using this data, the planning component 628 can determine a route to travel from a first location (e.g., a current location) to a second location (e.g., a target location) to avoid objects in an environment. In at least some examples, such a planning component 628 may determine there is no such collision free path and, in turn, provide a path which brings the vehicle to a safe stop avoiding all collisions and/or otherwise mitigating damage.

As discussed above, the computing device 632 may instantiate driving simulations using the various components and systems described herein to perform techniques similar or identical to those described above in processes 100 and 300. The computing device 632 may communicate/interact with one or more multiple vehicle control systems 602 to perform driving simulations in which the vehicle control systems 602 correspond to the simulated vehicle. Although not shown in this example, the computing device 632 also may include log data store(s) similar or identical to the log data store 212, and/or scenario component including simulated environments and objects similar or identical to the simulation scenario generator 204 as illustrated in FIG. 2. In some examples, log data store(s) 212 and/or simulation scenarios, environments, and objects may be stored remotely and accessible to the computing device 632, and/or may be stored within the memory 636 of the computing device 632. Using one or more vehicle control systems 602, log data store(s) 212 and/or simulation scenarios, environments, and objects, the computing device 632 may generate, instantiate, and execute driving simulations for simulated vehicles, including monitoring and receiving responses based on the simulations from vehicle control system(s) 602.

Computing device 632 may include one or more processors 634 and memory 636 communicatively coupled with the one or more processors 634. In the illustrated example, the memory 636 of the computing device 632 stores a log data component 638, an objects component 640, a scenario component 642, and a simulation component 644. Though depicted in FIG. 6 as residing in the memory 636 for illustrative purposes, it is contemplated that some or all of the systems and components 638-644 may additionally, and/or alternatively, be stored remotely and accessible to the computing device 632 through networks 616.

Computing device 632 may generate and execute log-based driving simulations using similar or identical techniques to those described above in process 300. The log data received by computing device 632 may correspond to data captured by a vehicle control system 602 within a vehicle traversing through a physical real-world environment. During a log-based driving simulation, computing device 632 may provide simulated environment and object data, based on the log data, to a simulated vehicle (e.g., vehicle control system 602). For instance, computing device 632 may receive and analyze the log data to detect specific objects within an environment, and the attribute data associated those objects (e.g., sizes, positions, trajectories, waypoints, or the like). The computing device 632 also may collect additional output log data associated with the vehicle simulated during the log-based driving simulation, and/or may evaluate the performance or actions of the simulated vehicle to determine a result or output of the simulation.

The log data component 638 of the computing device 632 may receive and analyze log data from a vehicle traveling within a real-world environment. For instance, the log data from may be stored and analyzed to detect objects, attribute data, trigger points, etc. Additionally and/or alternatively, the log data component 638 may retrieve and select log data to be used for generating log-based driving simulations. The log data component 638 and/or log data store 212 may store one or more log data. In some instances, the log data store 212 storing multiple log data from different vehicles and/or different trips or simulations may be stored within the computing device 632. The log data component 638 also may scan log data stored in the log data store 212 and identify log data that contains an event of interest. In some instances, the log data can include event marker(s) that indicate that an event of interest is associated with a particular log data. In some instances, a user can select a log data of a set of log data to be used to generate a simulated scenario.

The objects component 640 within the computing device 632 can identify one or more objects associated with the log data. For example, the objects component 640 can determine objects such as vehicles, pedestrians, animals, cyclists, trees, etc. in the log data and represented as simulated objects. In some instances, the objects component 640 can determine objects that interact with the vehicle associated with the log data. For purposes of illustration only, the objects component 640 can determine that an object traversed along a trajectory that began N meters from the vehicle and continued to traverse the environment in a direction away from the vehicle. In this example, the objects component 640 may determine not to incorporate that object when generating a log-based driving simulation, as it did not interact with the vehicle and would not provide valuable testing/validation data.

The scenario component 642 can use the log data identified by the log data component 638 to generate a simulated scenario. The simulated scenario includes a simulated environment (e.g., roadways, road markers, buildings, etc.) and simulated objects (e.g., other vehicles, pedestrians, cyclists, animals, etc.). In some instances, the scenario component 642 can use the perception data generated by the perception component 624 to apply simulated object models to the simulated objects. For example, the scenario component 642 can identify a simulated vehicle model and apply it to the simulated objects associated with vehicles. In some instances, the scenario component 642 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some instances, the scenario component 642 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some examples, the log data can indicate that a particular object has a characteristic and apply that characteristic to the simulated object. For purposes of illustration only, the log data can indicate that an object travels at approximately 10 mph below the speed limit and accelerates slowly. The scenario component 642 can determine that the object is a cautious vehicle and apply a cautious object model to the corresponding simulated object in the simulated environment. In some instances, the scenario component 642 can determine, based on behavior data in the log data, that an object as an aggressive object, a passive object, a neutral object, and/or other types of behaviors and apply behavior instructions associated with the behavior (e.g., a passive behavior, a cautious behavior, a neutral behavior, and/or an aggressive behavior) to the simulated object.

In some examples, the scenario component 642 can remove objects represented in the log data from a simulated scenario based on attributes associated with the objects as determined by planning component 628. In some instances, the scenario component 642 can remove objects based on an object/classification type (car, pedestrian, motorcycle, bicyclist, etc.), an object size (e.g., length, width, height, and/or volume), a confidence level, track length, an amount of interaction between the object and a vehicle generating the log data, and/or a time period.

In some examples, the scenario component 642 can determine which objects from the log data to include within the simulated scenario based on attributes associated with the objects as determined by planning component 628. In some instances, the scenario component 642 can include objects based on an object/classification type (car, pedestrian, motorcycle, bicyclist, etc.), an object size (e.g., length, width, height, and/or volume), a confidence level, track length, an amount of interaction between the object and a vehicle generating the log data, and/or a time period.

By way of example and without limitation, the log data can include objects of varying sizes such as mailboxes and buildings. The scenario component 642 can use a volume-based filter such that objects that are associated with a volume greater equal to or greater than a threshold volume of three cubic meters, such as buildings, are represented in the simulated scenario and objects that are associated with a volume less than three cubic meters are not represented in the simulated scenario, such as the mailboxes. In some instances, the scenario component 642 can use a track length filter where objects that have track lengths (e.g., data associated with a physical distance or a period of time) that do not meet or exceed a track length threshold are filtered from the simulated scenario. This can result in a simulated scenario that omits objects associated with poor detections during the time of data capture. In some instances, the scenario component 642 can use a motion-based filter such that objects associated with motion or a trajectory according to the log data are represented in the simulated scenario. In some instances, the filters can be applied in combination or mutually exclusively.

In some examples, the scenario component 642 can filter objects that do not meet or exceed a confidence threshold. By way of example and without limitation, the log data can indicate that an object is associated with a classification attribute of a pedestrian and a confidence value of associated with the classification of 5%. The scenario component 642 can have a confidence value threshold of 75% and filter the object based on the confidence value not meeting or exceeding the confidence value threshold. In some instances, a user can provide a user-generated filter that includes one or more attribute thresholds such that the scenario component 642 can filter objects that do not meet or exceed the one or more attribute thresholds indicated by the user-generated filter.

The simulation component 644 can execute the simulated scenario as a set of simulation instructions and generate simulation data. In some instances, the simulation component 644 can execute multiple simulated scenarios simultaneously and/or in parallel. This can allow a user to edit a simulated scenario and execute permutations of the simulated scenario with variations between each simulated scenario.

Additionally, the simulation component 644 can determine an outcome for the simulated scenario. For example, the simulation component 644 can execute the scenario for use in a simulation for testing and validation. The simulation component 644 generate the simulation data indicating how the vehicle control system 602 performed (e.g., responded) and can compare the simulation data to a predetermined outcome and/or determine if any predetermined rules/assertions were broken/triggered.

In some instances, the predetermined rules/assertions can be based on the simulated scenario (e.g., traffic rules regarding crosswalks can be enabled based on a crosswalk scenario or traffic rules regarding crossing a lane marker can be disabled for a stalled vehicle scenario). In some instances, the simulation component 644 can enable and disable rules/assertions dynamically as the simulation progresses. For example, as a simulated object approaches a school zone, rules/assertions related to school zones can be enabled and disabled as the simulated object departs from the school zone. In some instances, the rules/assertions can include comfort metrics that relate to, for example, how quickly an object can accelerate given the simulated scenario.

Based at least in part on determining that the vehicle control system 602 performed consistent with the predetermined outcome (that is, the autonomous controller did everything it was supposed to do) and/or determining that a rule was not broken or an assertion was not triggered, the simulation component 644 can determine that the vehicle control system 602 succeeded. Based at least in part on determining that the vehicle control system 602 performance was inconsistent with the predetermined outcome (that is, the autonomous controller did something that it wasn't supposed to do) and/or determining that a rule was broken or than an assertion was triggered, the simulation component 644 can determine that the vehicle control system 602 failed. Accordingly, based at least in part on executing the simulated scenario, simulation data can indicate how the vehicle control system 602 responds to each simulated scenario, as described above and determine a successful outcome or an unsuccessful outcome based at least in part on the simulation data.

The processor(s) 618 of the computing device(s) 604 and the processor(s) 634 of the computing device 632 can be any suitable processor capable of executing instructions to process data and perform operations as described herein. By way of example and not limitation, the processor(s) 618 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 620 of the computing device(s) 604, and the memory 636 of the computing device 632 are examples of non-transitory computer-readable media. The memory 620 and 636 can store an operating system and one or more software applications, instructions, programs, and/or data to implement the methods described herein and the functions attributed to the various systems. In various implementations, the memory 620 and 636 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 620 and memory 636 can be implemented as a neural network.

Figure 7:
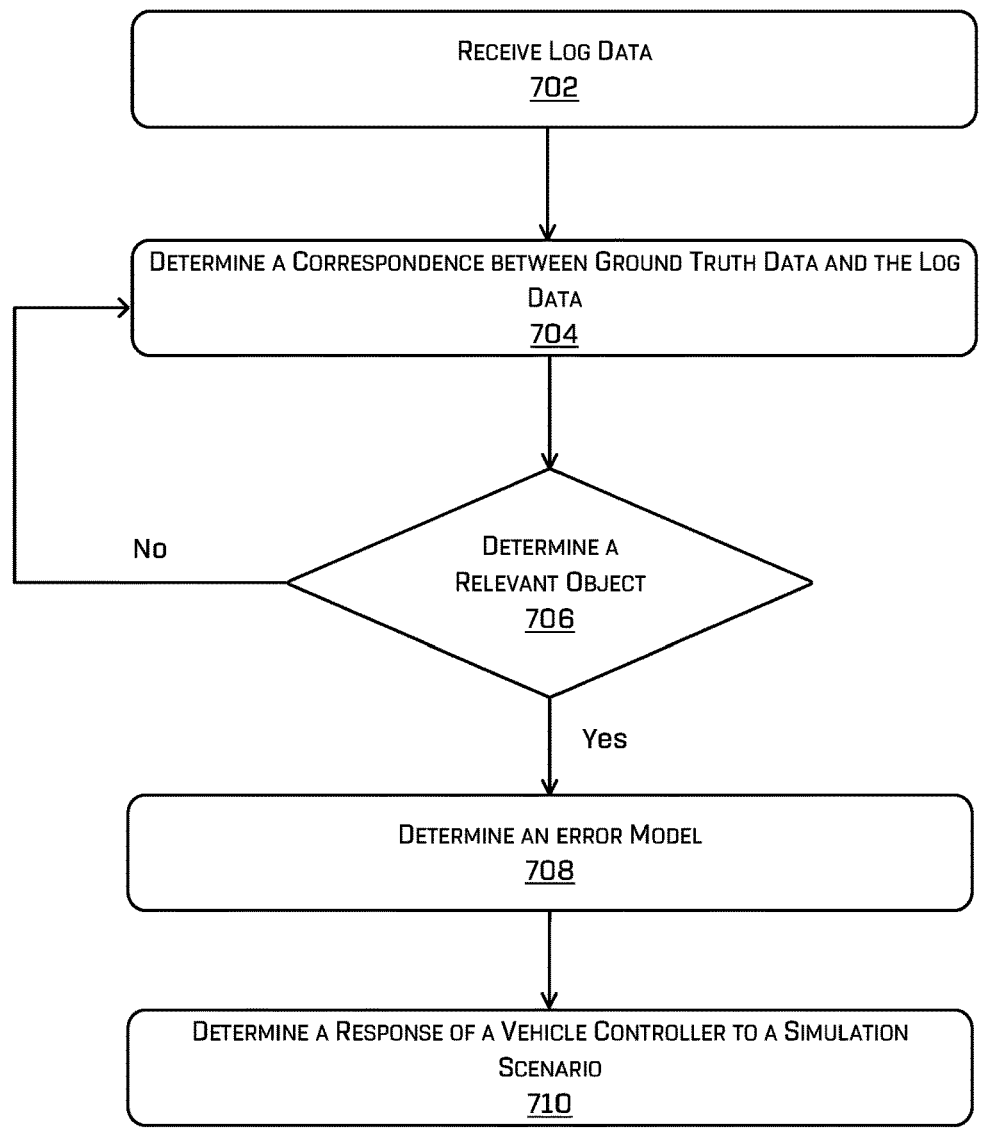
FIG. 7 illustrates an example process of determining a response of a vehicle controller to a simulation scenario.

FIG. 7 illustrates an example process 700 of verifying a behavior of a component of a vehicle, The process 700 may be similar or identical to a combination of process 100 and process 300 in some examples. In some instances, some or all of example process 700 may be performed by one or more components in computing architectures described in FIGS. 2 and 7, as described herein. For instance, example process 700 may be described with reference to computing device 632 in FIG. 6. However, it is contemplated that process 700 can utilize computing environments and architectures other than those depicted in FIG. 6.

At operation 702, the process can include receiving log data of a vehicle traversing a real world environment. Additional details associated with operation 702 are discussed in connection with FIG. 1, as well as throughout this disclosure.

At operation 704, the process can include determining a correspondence between ground truth data and the log data. In some examples, the correspondence may be a difference between an attribute of an object in the ground truth data and an attribute of an object in the log data. Additional details associated with operation 704 are discussed in connection with FIGS. 1, as well as throughout this disclosure.

At operation 706, the process can include determining a relevant object from at least the ground truth data or the log data. Additional details associated with operation 706 are discussed in connection with FIG. 1, as well as throughout this disclosure. If the selected object is determined to not be a relevant object, then the process restarts at operation 704, and another object is selected from the log data. If the selected object is determined to be a relevant object, then the process continues to operation 708.

At operation 708, the process can include determining an error model. In some examples, the error model can be determined based on the correspondence between ground truth data and the log data. Additional details associated with operation 708 are discussed in connection with FIGS. 2 and 3, as well as throughout this disclosure.

At operation 710, the process can include determining a response of a vehicle controller to a simulation scenario. In some examples, the response of the vehicle controller is determined by perturbing a simulated object within the simulation using the error model. In some examples, the vehicle controller is an autonomous vehicle controller for controlling an autonomous vehicle. Additional details associated with operation 710 are discussed in connection with FIGS. 2 and 3, as well as throughout this disclosure.

Example Clauses

A: A system comprising: one or more processors; and one or more computer-readable media storing computer-executable instructions that, when executed, cause the one or more processors to perform operations comprising: receiving log data associated with an autonomous vehicle traversing an environment; determining, based at least in part on a signal from a planning system of the autonomous vehicle or a driving corridor, that an object represented in at least one of the log data or ground truth data is a relevant object; determining, for the relevant object, a difference between a ground truth attribute and an attribute from the log data; determining, based at least in part on the difference, an error model; and determining, based at least in part on the error model, a response of an autonomous vehicle controller to a simulation scenario.

B: The system of paragraph A, wherein the attribute of the relevant object comprises at least one of a length; a width; a height; a velocity; a trajectory; a location; an orientation; a classification; a classification confidence level; segmentation information; time as false positive; or time as false negative.

C: The system of paragraph A or B, the operations further comprising: associating the difference with at least one of: a distance between the autonomous vehicle and the relevant object; a classification; a planner interaction type, a weather condition; a lighting condition; or a level of occlusion of the relevant object.

D: The system of any of paragraphs A-C, wherein determining the difference between the ground truth attribute and the attribute further comprises: receiving, from a perception system of the autonomous vehicle, perception data associated with the attribute from the log data; and determining the attribute from the log data based on the perception data.

E: The system of any of paragraphs A-D, wherein determining the response of the autonomous vehicle controller to the simulation scenario comprises: instantiating a simulated object in the simulation scenario; and perturbing an attribute of the simulated object based at least in part on the error model.

F: A method comprising: receiving log data associated with a vehicle traversing an environment; determining a correspondence between ground truth data and the log data; determining, based at least in part on at least one of the log data or the ground truth data, a relevant object in the environment; determining, based at least in part on the correspondence and the relevant object, an error model; and determining, based at least in part on the error model, a response of an autonomous vehicle controller to a simulation scenario.

G: The method of paragraph F, wherein determining the relevant object further comprises at least one of: receiving, from a planning system of the vehicle, a signal identifying an object as the relevant object; or determining that an object is located within a driving corridor determined by the vehicle.

H: The method of paragraph F or G, further comprising: associating the correspondence with at least: a distance between the vehicle and the relevant object; a classification; a planner interaction type, a weather condition; a lighting condition; or a level of occlusion of the relevant object; and wherein the error model indicates, for a particular distance between the vehicle and the relevant object, the classification, the planner interaction type, the weather condition, the lighting condition, or the level of occlusion of the relevant object, a variance of an attribute of the relevant object.

I: The method of any of paragraphs F-H, further comprising: receiving, from a perception system of the vehicle, perception data associated with an attribute of the relevant object; and determining the attribute based on the perception data.

J: The method of any of paragraphs F-I, wherein the correspondence comprises an attribute of an object wherein the attribute comprises at least one of a length; a width; a height; a velocity; a trajectory; a location; an orientation; a classification; a classification confidence level; segmentation information; time as false positive; or time as false negative.

K: The method of any of paragraphs F-J, wherein determining the response of the autonomous vehicle controller to the simulation scenario comprises: instantiating a simulated object in the simulation scenario; and perturbing an attribute of the simulated object based at least in part on the error model.

L: The method of paragraph K, wherein perturbing the attribute comprises updating the attribute based at least in part on a distribution associated with the error model.

M: The method of any of paragraphs F-L, wherein determining the error model further comprising: determining a first object represented in an attribute of the ground truth data; determining a second object represented in an attribute of the log data; determining, as the correspondence, a difference between the first object and the second object; and determining, based at least in part on the correspondence, the error model.

N: The method of any of paragraphs F-M, wherein determining the correspondence further comprises: determining, as a false positive, when an object is only represented in the log data; or determining, as a false negative, when an object is only represented in the ground truth data.

O: The method of any of paragraphs F-N, further comprising: transmitting the autonomous vehicle controller to the vehicle to control the vehicle.

P: One or more non-transitory computer-readable media storing instructions executable by a processor, wherein the instructions, when executed, cause the processor to perform operations comprising: receiving log data associated with a vehicle traversing an environment; determining a correspondence between ground truth data and the log data; determining, based at least in part on at least one of the log data or the ground truth data, a relevant object in the environment; determining, based at least in part on the correspondence and the relevant object, an error model; and determining, based at least in part on the error model, a response of an autonomous vehicle controller to a simulation scenario.

Q: The one or more non-transitory computer-readable media of paragraph P, wherein determining the relevant object further comprises at least one of: receiving, from a planning system of the vehicle, a signal identifying an object as the relevant object; or determining that an object is located within a driving corridor determined by the vehicle.

R: The one or more non-transitory computer-readable media of paragraph P or Q, wherein determining the response of the autonomous vehicle controller to the simulation scenario comprises: instantiating a simulated object in the simulation scenario; and perturbing an attribute of the simulated object based at least in part on the error model.

S: The one or more non-transitory computer-readable media of any of paragraphs P-R wherein determining the error model further comprising: determining a first object represented in an attribute of the ground truth data; determining a second object represented in an attribute of the log data; determining, as the correspondence, a difference between the first object and the second object; and determining, based at least in part on the correspondence, the error model.

T: The one or more non-transitory computer-readable media of any of paragraphs P-S, wherein determining the correspondence further comprises: determining, as a false positive, when an object is only represented in the log data; or determining, as a false negative, when an object is only represented in the ground truth data.

While the example clauses described above are described with respect to one particular implementation, it should be understood that, in the context of this document, the content of the example clauses can also be implemented via a method, device, system, computer-readable medium, and/or another implementation. Additionally, any of examples A-## may be implemented alone or in combination with any other one or more of the examples A-##.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
      receiving log data associated with an autonomous vehicle traversing an environment;
      receiving ground truth data associated with the environment determining, based at least in part on a signal from a planning system of the autonomous vehicle or a driving corridor, that an object represented in at least one of the log data or ground truth data is a relevant object;

determining, for the relevant object, a difference between a ground truth attribute associated with the ground truth data and an attribute from the log data;

determining, based at least in part on the difference, an error model;

determining, based at least in part on the error model, a response of an autonomous vehicle controller to a simulation scenario, wherein determining the response of the autonomous vehicle controller to the simulation scenario comprises instantiating, based at least in part on the object being a relevant object, a simulated object corresponding to the object in the simulation scenario; and transmitting, based at least in part on the response of the autonomous vehicle controller to the simulation scenario, the autonomous vehicle controller to the autonomous vehicle to control the autonomous vehicle.

2. The system of claim 1, wherein the attribute of the relevant object comprises at least one of
a length;
a width;
a height;
a velocity;
a trajectory;
a location;
an orientation;
a classification;
a classification confidence level;
segmentation information;
time as false positive; or
time as false negative.

3. The system of claim 1, the operations further comprising:
associating the difference with at least one of:
a distance between the autonomous vehicle and the relevant object;
a classification;
a planner interaction type,
a weather condition;
a lighting condition; or
a level of occlusion of the relevant object.

4. The system of claim 1, wherein determining the difference between the ground truth attribute and the attribute further comprises:
receiving, from a perception system of the autonomous vehicle, perception data associated with the attribute from the log data; and
determining the attribute from the log data based on the perception data.

5. The system of claim 1, wherein determining the response of the autonomous vehicle controller to the simulation scenario further comprises:
perturbing an attribute of the simulated object based at least in part on the error model.

6. The system of claim 1, wherein the object is a first object, the operations further comprising:
determining, based at least in part on a signal from a planning system of the autonomous vehicle or a driving corridor, that a second object represented in at least one of the log data or ground truth data is an irrelevant object; and wherein instantiating the simulated object corresponding to the object in the simulation scenario comprises instantiating, based at least in part on the first object being the relevant object and the second object being the irrelevant object, the simulated object corresponding to the first object in the simulation scenario.

7. A method comprising:
receiving log data associated with a vehicle traversing an environment;
receiving ground truth data associated with the environment;
determining a correspondence between the ground truth data and the log data;
determining, based at least in part on at least one of the log data or the ground truth data, a relevant object in the environment;
determining, based at least in part on the correspondence and the relevant object, an error model;
determining, based at least in part on the error model, a response of an autonomous vehicle controller to a simulation scenario,
wherein determining the response of the autonomous vehicle controller to the simulation scenario comprises instantiating a simulated object corresponding to the relevant object in the simulation scenario; and
transmitting, based at least in part on the response of the autonomous vehicle controller to the simulation scenario, the autonomous vehicle controller to the vehicle to control the vehicle.

8. The method of claim 7, wherein determining the relevant object further comprises at least one of:
receiving, from a planning system of the vehicle, a signal identifying an object as the relevant object; or
determining that an object is located within a driving corridor determined by the vehicle.

9. The method of claim 7, further comprising:
associating the correspondence with at least:
a distance between the vehicle and the relevant object;
a classification;
a planner interaction type,
a weather condition;
a lighting condition; or
a level of occlusion of the relevant object; and
wherein the error model indicates, for a particular distance between the vehicle and the relevant object, the classification, the planner interaction type, the weather condition, the lighting condition, or the level of occlusion of the relevant object, a variance of an attribute of the relevant object.

10. The method of claim 7, further comprising:
receiving, from a perception system of the vehicle, perception data associated with an attribute of the relevant object; and
determining the attribute based on the perception data.

11. The method of claim 7, wherein the correspondence comprises an attribute of an object wherein the attribute comprises at least one of
a length;
a width;
a height;
a velocity;
a trajectory;
a location;
an orientation;
a classification;
a classification confidence level;
segmentation information;

time as false positive; or time as false negative.

12. The method of claim 7, wherein determining the response of the autonomous vehicle controller to the simulation scenario further comprises:

perturbing an attribute of the simulated object based at least in part on the error model.

13. The method of claim 12, wherein perturbing the attribute comprises updating the attribute based at least in part on a distribution associated with the error model.

14. The method of claim 7, wherein determining the error model further comprising:

determining a first object represented in an attribute of the ground truth data;

determining a second object represented in an attribute of the log data;

determining, as the correspondence, a difference between the first object and the second object; and determining, based at least in part on the correspondence, the error model.

15. The method of claim 7, wherein determining the correspondence further comprises:

determining, as a false positive, when an object is only represented in the log data; or determining, as a false negative, when an object is only represented in the ground truth data.

16. One or more non-transitory computer-readable media storing instructions executable by a processor, wherein the instructions, when executed, cause the processor to perform operations comprising:

receiving log data associated with a vehicle traversing an environment;

receiving ground truth data associated with the environment;

determining a correspondence between the ground truth data and the log data;

determining, based at least in part on at least one of the log data or the ground truth data, a relevant object in the environment;

determining, based at least in part on the correspondence and the relevant object, an error model;

determining, based at least in part on the error model, a response of an autonomous vehicle controller to a simulation scenario, wherein determining the response of the autonomous vehicle controller to the simulation scenario comprises instantiating a simulated object corresponding to the relevant object in the simulation scenario; and transmitting, based at least in part on the response of the autonomous vehicle controller to the simulation scenario, the autonomous vehicle controller to the vehicle to control the vehicle.

17. The one or more non-transitory computer-readable media of claim 16, wherein determining the relevant object further comprises at least one of:

receiving, from a planning system of the vehicle, a signal identifying an object as the relevant object; or determining that an object is located within a driving corridor determined by the vehicle.

18. The one or more non-transitory computer-readable media of claim 16, wherein determining the response of the autonomous vehicle controller to the simulation scenario further comprises:

perturbing an attribute of the simulated object based at least in part on the error model.

19. The one or more non-transitory computer-readable media of claim 16 wherein determining the error model further comprises:

determining a first object represented in an attribute of the ground truth data;

determining a second object represented in an attribute of the log data;

determining, as the correspondence, a difference between the first object and the second object; and determining, based at least in part on the correspondence, the error model.

20. The one or more non-transitory computer-readable media of claim 16, wherein determining the correspondence further comprises:

determining, as a false positive, when an object is only represented in the log data; or determining, as a false negative, when an object is only represented in the ground truth data.

* * * * *